(No Model.)
E. G. DICKINSON & A. C. SASSER.
FUMIGATOR.
No. 499,877.
Patented June 20, 1893.
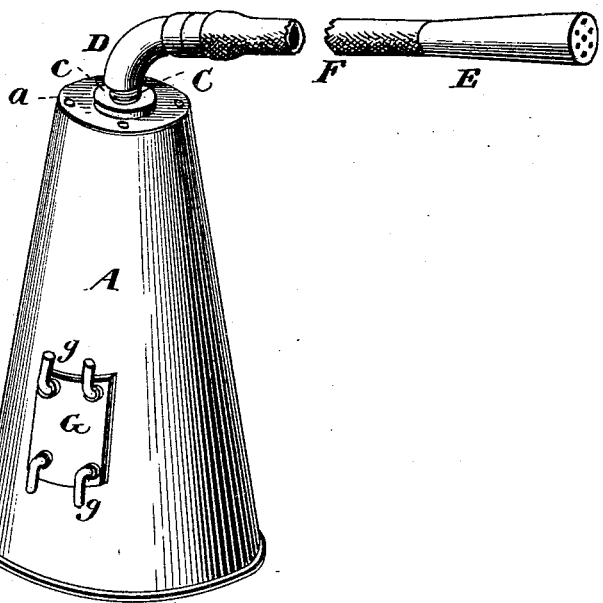
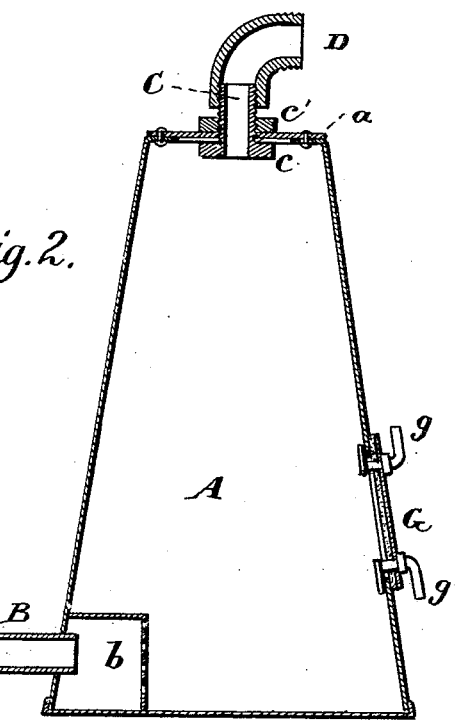
Witnesses.
A. Ruppert.
A. A. Daniels
Inventors.
Elijah G. Dickinson
Abner C. Sasser
per Thomas P. Simpson
atty

UNITED STATES PATENT OFFICE.

ELIJAH GRAVES DICKINSON AND ABNER CALVIN SASSER, OF MADISON, FLORIDA.

FUMIGATOR.

SPECIFICATION forming part of Letters Patent No. 499,877, dated June 20, 1893.

Application filed August 24, 1892. Serial No. 443,943. (No model.)

*To all whom it may concern:*

Be it known that we, ELIJAH GRAVES DICKINSON and ABNER CALVIN SASSER, citizens of the United States, residing at Madison, in the county of Madison and State of Florida, have invented certain new and useful Improvements in Insect-Exterminators; and we do hereby declare the following to be a full, clear, and exact description of the invention, such as will enable others skilled in the art to which it appertains to make and use the same.

The special object of the invention is to make a convenient metallic vessel whereby sulphur may be vaporized and blown with a bellows upon plants or vegetables in or out of a house or into the homes or abodes of insects. In this way, we never fail to kill all kinds of insects in grain, or on shrubbery and vegetables.

Figure 1 is a perspective view of our fumigator, and Fig. 2 a vertical section thereof.

In the drawings, A represents the fumigator, which is made of metal, in an upwardly tapering form and with a solid bottom.

B is the bellows-pipe in which is placed the nozzle so as to force air therein and force the sulphur vapor out of the tube C at the top. This tube or neck is secured to the top $a$ by means of a fast collar $c$ and a screw collar $c'$, while the top $a$ is fastened to the upper edge of the vessel by rivets. On the neck C screws the elbow tube D and in this screws the coupling of a nozzle E having the usual perforations at the end and held to the coupling by a flexible tube F. Thus it will be seen that the nozzle E can be turned by the hand in any direction. We may however use a simple metallic nozzle screwing into the elbow which may be swiveled on the neck C. The bellows pipe B has preferably the perforated nozzle $b$ attached thereto. By careful experiments, we find that the fume will best serve its purpose when hot, or as warm as possible.

The door G through which the sulphur rolls or fuel is put into the fumigator, is held in place by the four iron latches $g$ and lined on the inside with asbestos, the latches being swiveled.

The sulphur is first melted and then absorbed by gunny bagging or other suitable absorbent, the latter being rolled up in rolls for use. We put as many as desired in the fumigator, the strips of bagging being preferably three or four inches wide. The vapor which is generated is then blown into or upon whatever we wish to fumigate.

We are aware that fumigators have been used with a bellows pipe at the bottom but not with our perforated chamber or nozzle E which sprays the volume or current of air (as it is injected from the bellows) upon the chemicals. The spraying of the air upon the sulphur (which is preferably used, and melted as the absorbent burns) greatly increases the quantity of vapor generated in a given time, the combustion of the absorbent being made much more rapid. The advantage of arranging the fixed collar $c$ and screw collar $c'$ on the neck is two-fold, namely, that it prevents the waste of fume by leakage where it joins with the top of vessel; also allows the top of vessel to be replaced by a new one.

We are aware that the component parts of our fumigator are severally old but

What we claim is—

An improved fumigator consisting of an upwardly tapered vessel with a side door, bellows pipe near bottom, perforated partition on one side of bottom forming an air-chamber into which the bellows pipe discharges, and an internally threaded neck at the center of top, said neck being adapted to receive a nozzle-pipe elbow as shown and described.

In testimony whereof we have affixed our signatures in presence of witnesses.

ELIJAH GRAVES DICKINSON.
ABNER CALVIN SASSER.

Witnesses as to Dickinson's signature:
   L. VANN,
   JOSIE S. VANN.

Witnesses as to Sasser's signature:
   T. J. BLALOCK,
   L. VANN.